United States Patent [19]
Miller et al.

[11] Patent Number: 5,213,471
[45] Date of Patent: May 25, 1993

[54] PROPELLER PITCH CONTROL

[75] Inventors: Edwin K. Miller; Robert L. Roberts; Petr Hora; David L. Joyce, all of West Chester; John S. Mears, Cincinnati, all of Ohio

[73] Assignee: General Electric Company, Cincinnati, Ohio

[21] Appl. No.: 576,884

[22] Filed: Sep. 4, 1990

[51] Int. Cl.⁵ ................................................ B65H 3/00
[52] U.S. Cl. ...................................... 416/44; 416/129; 416/154; 416/156; 416/162
[58] Field of Search ................ 416/128, 129, 44, 147, 416/154, 156, 160, 162, 166

[56] References Cited

U.S. PATENT DOCUMENTS

| | | | |
|---|---|---|---|
| 2,667,228 | 1/1954 | Wood | 416/36 |
| 3,024,848 | 3/1962 | Chilman | 416/154 |
| 3,551,069 | 12/1976 | Morris | 416/154 |
| 3,900,274 | 8/1975 | Johnston | 416/160 |
| 4,711,615 | 12/1987 | Rusu | 416/154 |
| 4,878,809 | 11/1989 | Ames | 416/160 |
| 4,934,901 | 6/1990 | Duchesneau | 416/160 |
| 4,936,746 | 6/1990 | Mayo | 416/128 |
| 5,019,006 | 5/1991 | Schneider | 416/44 |
| 5,100,729 | 4/1991 | Adamson | 416/129 |

Primary Examiner—Edward K. Look
Assistant Examiner—Therese M. Newholm
Attorney, Agent, or Firm—Jerome C. Squillaro; John R. Rafter

[57] ABSTRACT

The invention concerns a system for controlling an aircraft propeller. A hydraulic motor controls pitch of the propeller blades. The propeller blades are characterized by the absence of feather-inducing counterweights. An overspeed governor senses when propeller speed exceeds a limit, and, in response, assumes control of the hydraulic motor and drives the blades toward a coarsened pitch position, which reduces the propeller speed. In another form of the invention, a mechanical brake can override the hydraulic motor and mechanically retard a rotating gear, which causes the propeller blades to move toward a coarsened pitch.

9 Claims, 10 Drawing Sheets

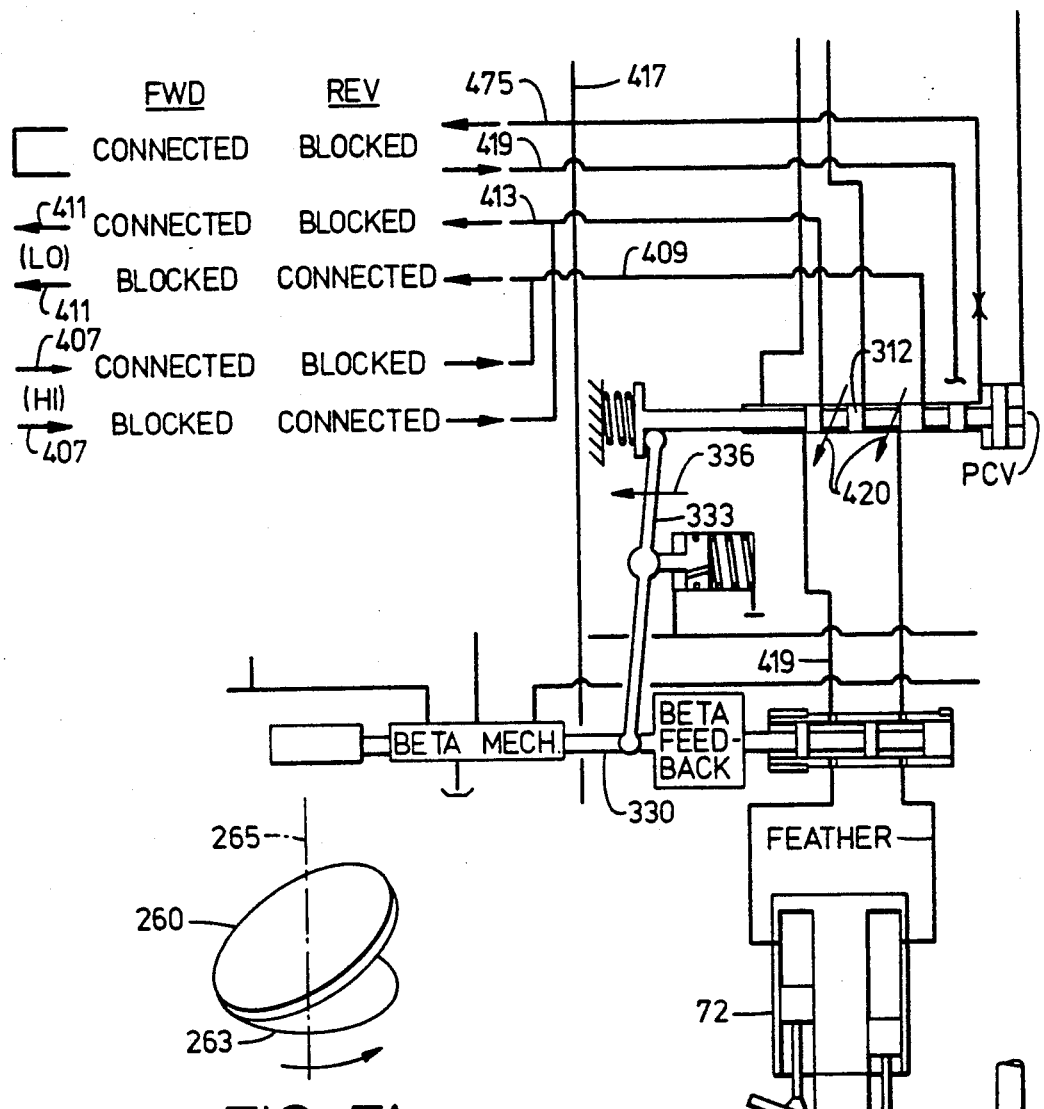
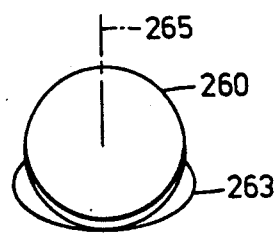
FIG. 7A
FIG. 7B
FIG. 9

FORWARD THRUST

REVERSE THRUST

PROPELLER PITCH CONTROL

The invention concerns a hydraulic system for changing pitch of an aircraft propeller.

BACKGROUND OF THE INVENTION

In addition to changing pitch of the propeller, the invention provides several safety features. One of them relates to a brake which stops a rotating gear within a gear train which changes pitch. Stopping the gear train drives the propeller blades to a feathered condition. In order to explain how such a brake can cause feathering, it is first necessary to explain the operation of the gear train. This explanation occupies the remainder of the Background.

FIG. 1 shows an aircraft 3 powered by engines with which the invention can be used. The engines each drive a pair of counterrotating propellers. One propeller includes blades 6 and the other includes blades 9. "Counterrotating" means that the blades rotate in opposite directions about a common axis 67, as indicated by arrows 12 and 15.

The blades are of the variable-pitch type, meaning that blades 6 and 9 can rotate about respective pitch axes 6A and 9A (shown in FIG. 2), as indicated by arrows 33 and 36. Changing pitch allows the angle-of-attack of the blades to be optimized for the prevailing engine power level and flight conditions.

FIG. 2 shows a type of turbine system which can drive the counterrotating propellers. A gas generator (not shown) provides a hot gas stream 30. The gas stream impinges upon two counterrotating turbines 18 and 24. Turbine 24 is supported by a stationary frame 37 by bearings 27A and 27B. Turbine 18 rides upon turbine 24, by means of bearings 21A and 21B. The propeller blades 6 and 9 are directly connected to the turbines 18 and 24, and rotate at the same speeds as the respective turbines.

Shafts 49 and 87 are connected to blades 6 and 9, and a respective bevel gear 45 or 90 is connected to each shaft. Rotation of the shafts causes pitch of the blades to change. A system which drives the shafts is shown in FIG. 3.

FIG. 3 shows, in simplified, exemplary, schematic form, one type of gear train which can accomplish the change in pitch. A pair of bevel ring gears 51 and 53, which are concentric about the engine axis 67, both simultaneously engage the blade bevel gear 45. When the bevel ring gears rotate in opposite directions, they rotate the blade bevel gear 45, causing pitch to change. The bevel ring gears are each affixed to a respective ring gear 56 or 58. A compound planet gear, comprising sub-planets 61A and 61B affixed to each other, engages the ring gears 56 and 58, but at different gear ratios. That is, the ratio between sub-planet 61A and ring gear 56 is different from the ratio between sub-planet 61B and ring gear 58. Because of the different gear ratios, when the planet gear rotates, the ring gears 56 and 58 rotate in opposite directions, causing pitch to change.

The planet gear is driven by a sun gear 63, which is, in turn, driven by a ring gear 66 attached to it by means of shell 68. A motor 72 drives the latter ring gear 66 by means of a pinion gear 75, causing the change in pitch. A similar gear train drives the other blade bevel gear 90.

It is significant that, with the system of FIG. 3, when pitch is unchanging, the sun gear 63 is required to rotate at synchronous speed with the propeller blade 6. Consequently, the pinion gear 75 must rotate constantly. Further, if there is no disengagement mechanism provided between the motor 72 and the pinion gear 75, the motor 72 also must be constantly rotating. Such constant rotation can be disadvantageous in some situations. FIG. 4 illustrates a more detailed gear train which eliminates the requirement of constant motor rotation.

In a general sense, FIG. 4 adds a differential 130 which subtracts the speed of the propeller from the speed of the sun gear 63 in FIG. 3, making the motor 72 stationary when pitch is not changed. When pitch change is desired, the pinion 112 is rotated relatively to the pinion 115 which is always rotating at a speed proportional to the propeller speed (which is driven by ring gear 109).

In FIG. 4, some additional components to those in FIG. 3 are shown. For example, shaft 49 does not connect to the blade 6 directly, but, instead, connects through a planetary torque multiplier 52. The torque multiplier allows the shaft 49 to carry less torque, and thus to be manufactured at a smaller diameter. The reduction in diameter is advantageous because the shaft 49 passes through a turbine blade 46 (see FIG. 2 or 3). With the reduced shaft diameter, the aerodynamic designers of the turbine blade 46 need not significantly redesign the blade 46 in order to contain the shaft 49.

A second difference between FIGS. 3 and 4 is that there are three ring gears (i.e., 56A, 58A, and 59) engaging three sub-planets (i.e., 95, 96, and 97), instead of two ring gears with two sub-planets as in FIG. 3. Two of the three ring gears in FIG. 4, labeled 56A and 58A, can be termed movable ring gears, because they move with respect to the blade 6 when pitch changes. (A third movable ring gear will be introduced later.) The remaining ring gear, labeled 59, can be termed a fixed ring gear because it is fastened to the blade 6 by a frame 100, and remains synchronous with the blade 6 at all times. (A second fixed ring gear is introduced later.)

All three sub-planets 95, 96, and 97 are locked together on a common shaft. The three gear ratios between the sub-planets and their respective ring gears (i.e. sub-planet 95/ring gear 56A, sub-planet 96/ring gear 58A, and sub-planet 97/ring gear 59) are different. Consequently, when the proper ratios are used, then as the sub-planets rotate about their axis 102, they cause movable ring gears 56A and 58A to rotate in opposite directions relative to each other. Further, the movable ring gears mole with respect to the fixed ring gear 59: the movable ring gears view the fixed ring gear as stationary.

It is noted that, when pitch is unchanging, the two movable ring gears 56A and 58A rotate at synchronous speed with blade 6 and the fixed ring gear 59. There is no relative rotation between any of them. Further, under these conditions, the sub-planets are not rotating about their own axis 102, but are orbiting about the engine centerline 67.

To cause a change in pitch, a sun gear 101 rotates with respect to the fixed ring gear 59. This sun gear is driven by a third movable ring gear 107, by means of shell 104. Two pinion gears 112 and 115, mounted on respective shafts 121 and 118, cause the change in pitch. (Pinions 112 and 115 do not orbit about the centerline 67; they are fixed, as are all components located to the right of pinion 115.)

For the pitch change to occur, relative rotation is required between the two pinions 112 and 115, which causes third movable ring gear 107 to move with respect to the second fixed ring gear 109. Consequently, the sun gear 101 moves with respect to the first fixed ring gear 59, causing the sub-planets to rotate about their axis 102, and to change their orbital speed slightly, because of the rotation about their axis 102. Rotation of the sub-planets causes the first and second movable ring gears 56A and 58A to rotate in opposite relative directions, rotating bevel pinion 45 and thus changing pitch.

As thus far described, the pinion gears 112 and 115 in FIG. 4 experience constant rotation. However, this constant rotation is decoupled from the motor 72 by a differential 130, which will now be described.

A key feature of the differential is a planetary system comprising sun gear 144, planet gears 141 (carried by a carrier 138), and ring gear 147. The planet carrier 138 rotates constantly at a speed proportional to that of pinion 115. Similarly, the ring gear 147 rotates constantly at a speed equal to that of pinion 112. The constants of proportionality are chosen (by choosing the proper gear ratios) such that the sun gear 144 is stationary when pinions 112 and 115 rotate at equal speeds. Consequently, motor 72 (which drives sun gear 144) does not rotate when pitch change is absent.

Further, when the motor 72 does rotate, pinions 112 and 115 rotate at different speeds: pinion 112 either accelerates or decelerates with respect to pinion 115, depending on the direction of rotation of the motor 72. If pinion 112 decelerates, pitch changes in one direction, for example, toward feathered pitch. If the pinion 112 accelerates, pitch changes in the other direction, for example, toward flat (or "fine") pitch. (The terms flat and feather are explained with reference to FIGS. 10 and 11, which are discussed later.)

The present invention is concerned with part of a control system which drives the motor 72, when the motor is of the hydraulic type. The invention also includes a brake which stops shaft 121 in FIG. 4, which drives the propeller toward feathered pitch, irrespective of the action of the motor 72.

OBJECTS OF THE INVENTION

It is an object of the invention to provide an improved pitch-change mechanism for an aircraft propeller.

It is a further object of the invention to provide a control system for a pitch-change mechanism which drives the propeller toward feathered pitch when certain types of malfunction occur.

SUMMARY OF THE INVENTION

In one form of the invention, a hydraulic motor controls pitch of propeller blades. The blades are characterized by the absence of feather-inducing counterweights. An overspeed governor senses when propeller speed exceeds a limit, and, in response, assumes control of the motor and drives the blades toward a feathered pitch position, which reduces the propeller speed. In another form of the invention, a mechanical brake can override the motor and mechanically retard a rotating gear, which causes the propeller to move toward feather.

BRIEF DESCRIPTION OF THE DRAWING

FIGS. 7A–7E illustrate, in simplified schematic form, the principles of operation of the motor 72 in FIG. 6.

FIG. 9 illustrates the operation of a fine pitch limiter contained in FIGS. 5A and 5B.

DETAILED DESCRIPTION OF THE INVENTION

GENERAL DESCRIPTION

The invention provides several important functions, seven of which are the following. One, an electrohydraulic servovalve (EHSV) controls pitch during normal operation by controlling an hydraulic motor which changes pitch. Two, if the propeller should exceed a speed limit, an overspeed governor takes over control of the hydraulic motor and drives the blades toward feather, maintaining constant rpm at the overspeed governor speed setting. Three, a mechanical brake can also induce feathering, independently of (and perhaps supplemental to) the overspeed governor. Four, if pitch is detected as becoming too fine (which can cause an overspeed condition), a system drives pitch toward feather. Five, a fine pitch limit can be imposed under certain flight conditions, in order to keep pitch above a certain angle, thus assuring that pitch and thrust will not fall below a certain level. Six, a system for providing overspeed protection while the propeller is operating in reverse thrust is provided. Seven, the system eliminates the need for feather-inducing counterweights on propellers.

FIG. 5: OVERVIEW

Figure 5A:
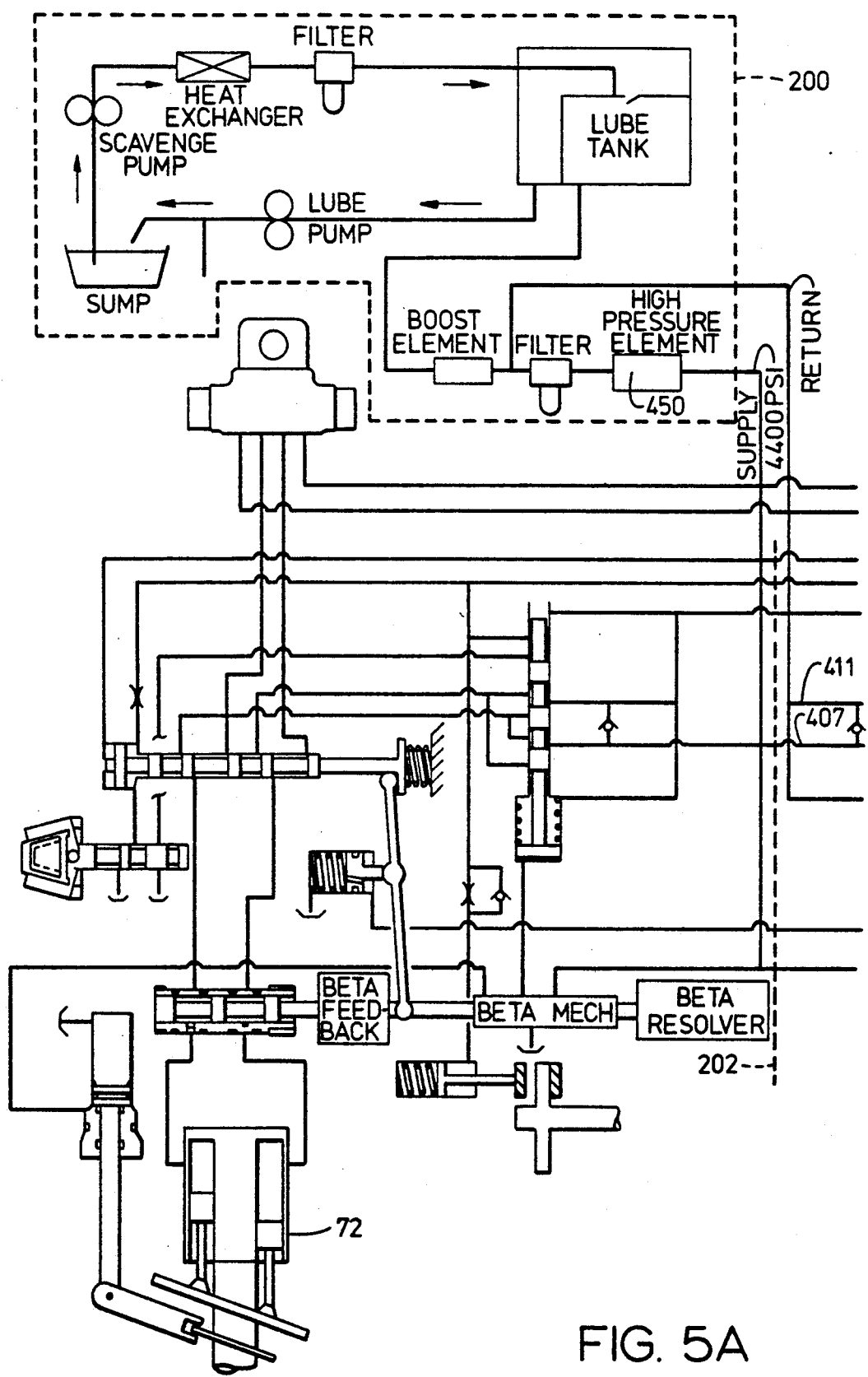
FIGS. 5A and 5B show one form of the present invention.
Figure 5B:
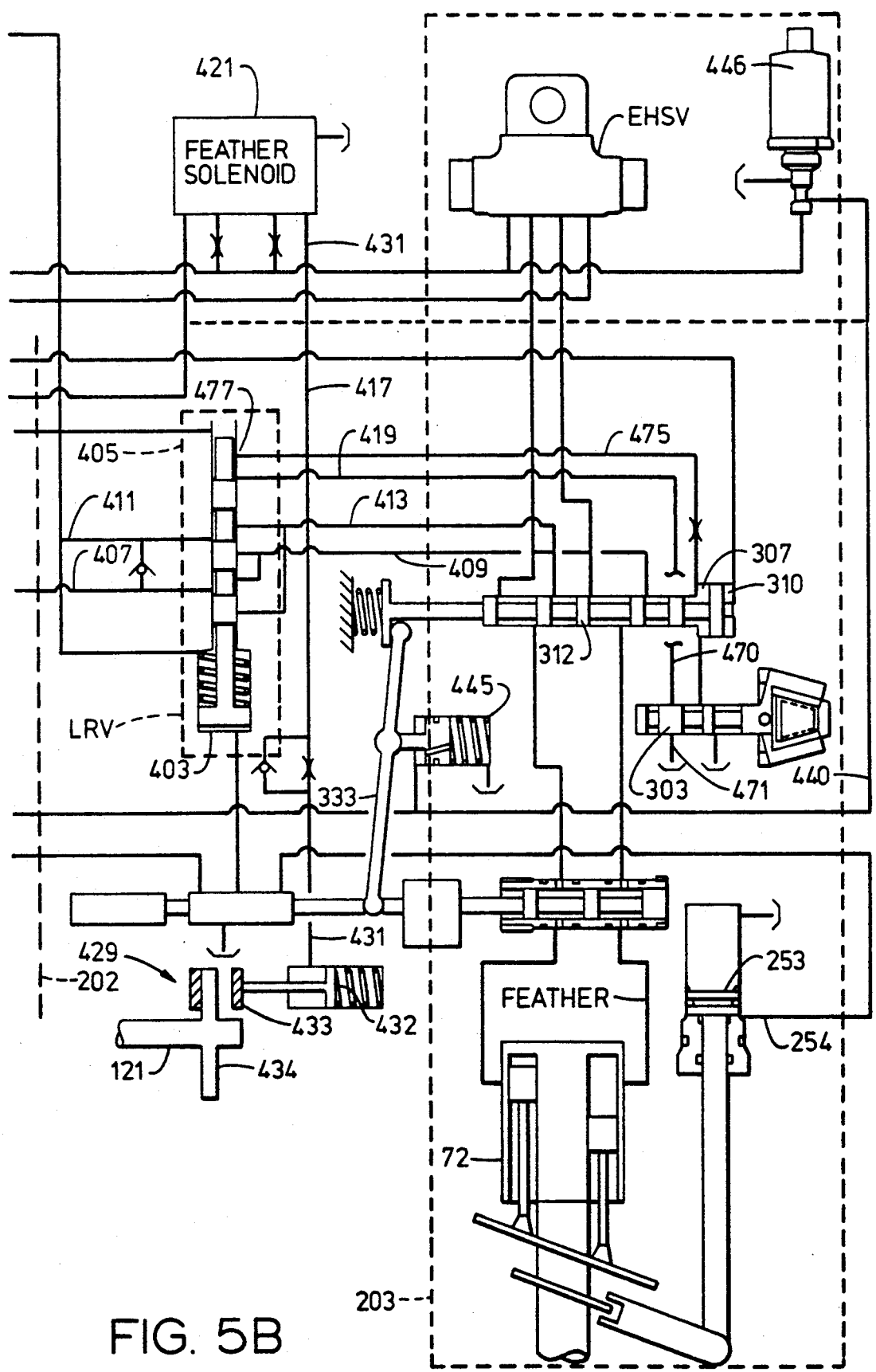

FIG. 5 is an overview of one form of the hydromechanical part of the invention. With the exception of the components contained within dashed block 200, this Figure can be divided into two nearly mirror-image subsystems by dashed line 202. Each subsystem controls a hydraulic motor 72 of the type schematically shown in FIG. 6, and each motor changes pitch of one of the sets of blades 6 or 9 in FIG. 2. The subsystem located on the right side of the dashed line 202 in FIG. 5 will now be discussed, with reference to FIGS. 6 through 11. The subsystem on the left side is substantially identical.

FIG. 6: NORMAL OPERATION

Figure 6:
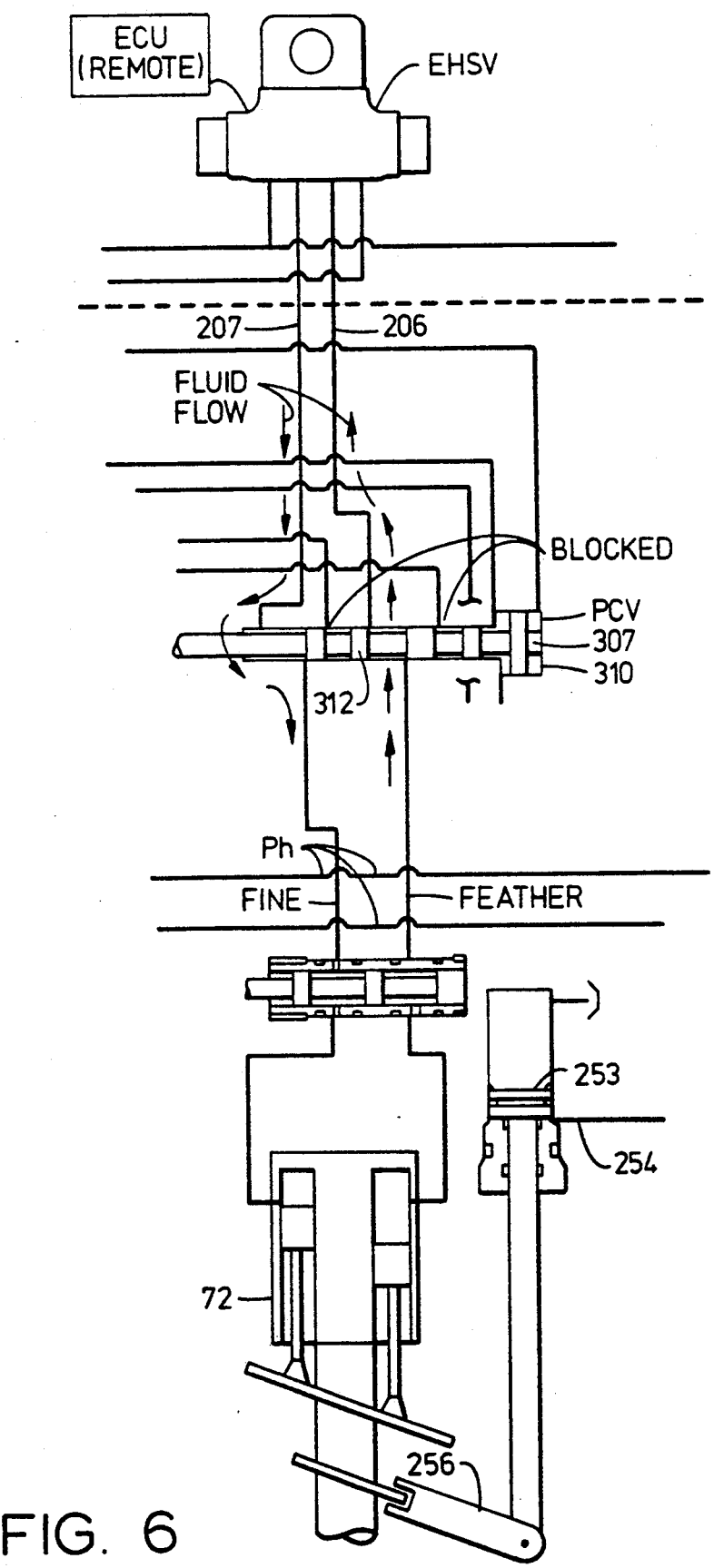
FIG. 6 shows an electrohydraulic servovalve (EHSV) which controls pitch by controlling a motor 72, during normal operation.

FIG. 6 shows some of the components located in block 203 in FIG. 5. During normal operation, an electrohydraulic servovalve (EHSV) in FIG. 6 controls pitch by applying pressure to lines 206 and 207. At this time, a pitch coarsening valve (PCV) is in the position shown, such that the PCV does not obstruct the control of the hydraulic motor by the EHSV. Fluid flows as indicated by the dashed lines so labeled (as well as in the opposite directions), so that the EHSV controls pitch by controlling the motor 72.

FIGS. 7A-7E: SCHEMATIC OF HYDRAULIC MOTOR

Figure 7C:
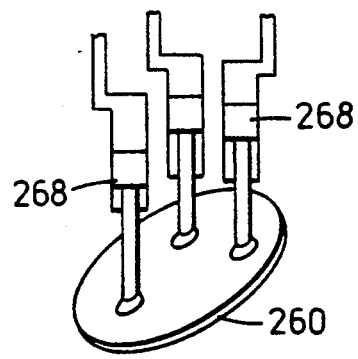

The hydraulic motor 72 in FIG. 6 is of the axial piston slipper type. Such motors are available from Vickers, located in Jackson, Miss. The principle of operation of such motors can be explained by the simplified schematics of FIGS. 7A-7E. FIG. 7A shows a disc 260 wobbling about an axis 265. The motion of the disc can be analogized to a saucer wobbling on a table. The position of the disc is first as in FIG. 7A, and then as in FIG. 7B, and so on.

This type of wobbling motion can be induced by hydraulic pistons 268 in FIG. 7C. Hydraulic commutating circuitry (not shown), known in the art, controls sequential pressurization of pistons 268 and wobbles the disc 260. (In this case, there is disc rotation as indicated by the arrow in FIG. 7A.)

Figure 7D:
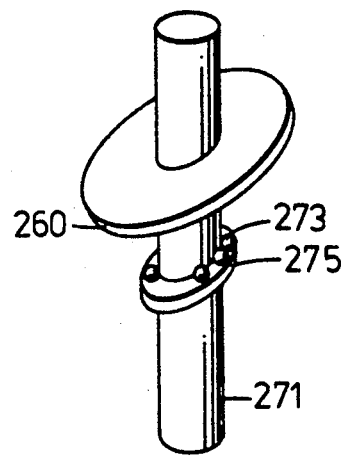
Figure 7E:
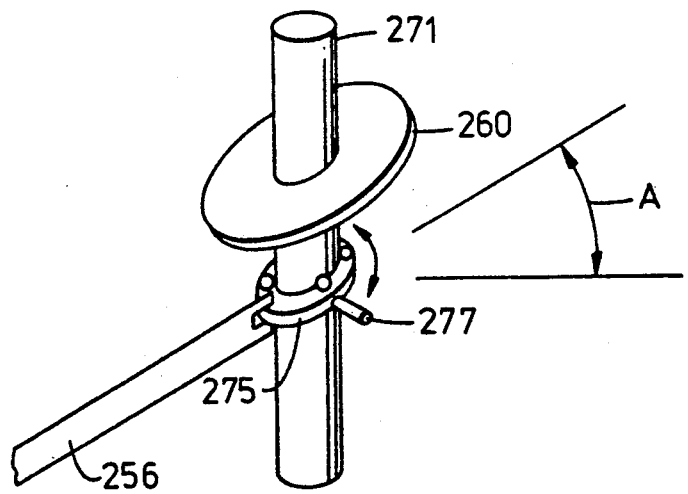

Now, if the disc is associated with a shaft 271 in FIG. 7D having a cam plate 275 attached to shaft 271 by means of pivot pins 277, with bearings 273 between the cam plate and the disc, the wobbling will cause the cam and shaft to rotate. If the cam 275 pivots about a pin 277 as in FIG. 7E, the mechanical advantage of the disc 260 over the shaft will change as angle A changes. A large angle provides a large advantage to the disc, while a small angle (but greater than than zero degrees) provides a small advantage.

Further, if the pistons are driven by a constant displacement pump, then changing angle A will change the shaft speed. That is, for example, if the pump supplies one gallon per minute, then, with a given angle A, a given shaft speed will be attained. If angle A is decreased, then the maximum stroke of the pistons 268 decreases, and the displacement per stroke decreases. In order to maintain the displacement of one gallon per minute, both (a) the number of strokes and (b) wobbles of the disc per minute must increase, so that shaft speed increases.

Therefore, angle A controls the speed-torque characteristics of the motor 72. At a small angle (but greater than zero degrees), displacement per stroke is low, torque is low, and speed is high. At a large angle, displacement per stroke is high, torque is high, and speed is low.

A lever 256, also shown with the motor 72 in FIG. 6, changes angle A. A control piston 253, actuated by pressure in line 254 in FIGS. 5 and 6, moves the arm 256. The piston is controlled by apparatus labeled BETA MECH, which is explained later.

Therefore, for present purposes, motor 72 in FIG. 6 acts as a convertor which converts hydraulic pressure and flow on either lines 206 or 207 into rotary motion. Pressure on line 206 drives the motor in one direction, thus driving the propeller (not shown in FIG. 6) toward feather. Pressure on line 207 drives the motor in the opposite direction and drives the propeller toward fine pitch. The lever arm 256 controls speed and torque delivered by the motor.

FIG. 8: OVERSPEED GOVERNOR (OSG)

It is possible that the propeller can unintentionally accelerate to a speed which is too great. This can occur, for example, if a malfunction occurs in the pitch-change system, and allows the propeller to attain a pitch angle which is too flat. When pitch is too flat, the propeller does not "bite" sufficiently into the airstream, and does not provide a sufficient load to the turbines 18 or 24 in FIG. 2. The lack of load can cause the propeller to reach an excessive speed.

Figure 8:
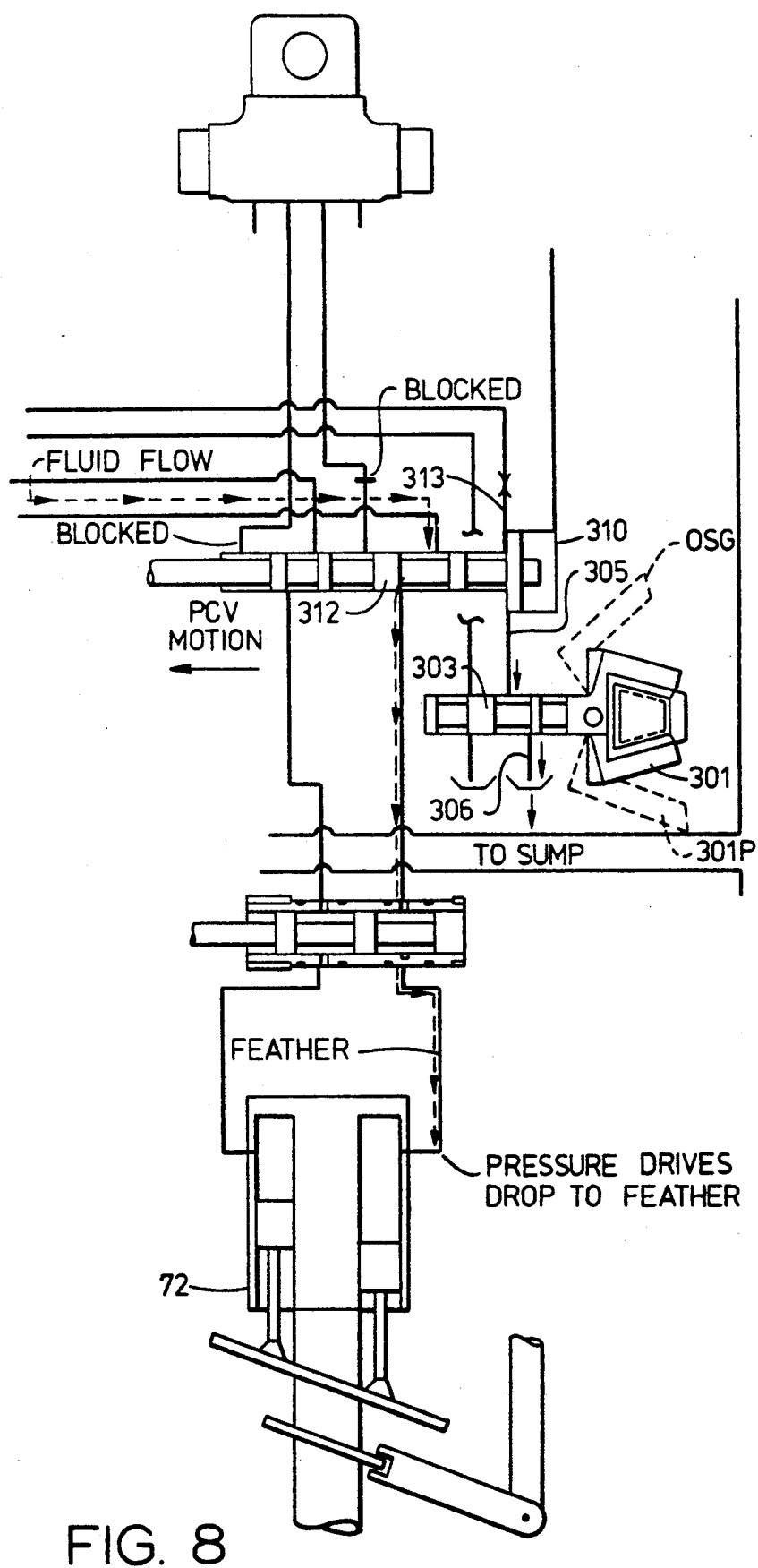
FIG. 8 illustrates the operation of an overspeed governor contained in FIGS 5A and 5B.

An overspeed governor (OSG) in FIG. 8 prevents the excessive speed from occurring. Flyweights 301 are mechanically linked to the propellers (the linkage is not shown). When speed becomes too high, the flyweights reach phantom position 301P, and draw valve 303 to the right, thus connecting line 305 with line 306. The latter line 306 leads to an oil collection sump.

Consequently, cavity 307 in FIG. 6 now connects with the sump in FIG. 8, and the high pressure (about 4000 psi) in the opposite cavity 310 causes the PCV 312 to shift leftward, as indicated by the arrow. The leftward motion now connects a high pressure line 313 to the FEATHER line of the hydraulic motor, as indicated by dashed path labeled FLUID FLOW. The hydraulic motor 72 now drives the pitch toward a feathered position, which increases the propeller's bite into the air, thus loading the turbine in FIG. 2 which drives the propeller, and restricting propeller speed.

This OSG activity has been described as a fully on/fully off situation. However, in fact, a gradual process occurs. That is, when an overspeed is incipient, the OSG valve cracks open, and makes a small connection between the cavity 307 in FIG. 6 and the sump. The PCV 312 moves slightly to the left, causing a slight increase in fluid pressure from line 313 to be applied to the FEATHER line, thus driving the propeller slightly toward feather, which should decrease propeller speed. If speed continues to increase, this procedure repeats, further increasing pressure in the FEATHER line, until the propeller speed is reduced to a proper level. During this operation, the pressure in the other line of the hydraulic motor is vented simultaneously to the return sump.

FIG. 9: PITCH LIMITING: FLIGHT FINE LIMIT (FFL)

Another type of pitch limiting apparatus is shown in FIG. 9. The block labeled "BETA MECH" (Beta is a term of art used to represent pitch angle) represents a system (not shown) which is mechanically (or hydraulically) linked to the propeller blades and which moves a rod 330 left and right in response to the sensed pitch angle. For example, as pitch starts moving toward fine pitch, the rod moves to the right and lever 333 moves as indicated by arrow 336. If pitch becomes too fine, the lever contacts the PCV 312 and drives the PCV 312 to the left.

Leftward motion of the PCV causes pressure to be applied to the FEATHER line, and reduces propeller speed, in the same manner that the OSG valve in FIG. 8 does. This type of action is further explained later.

Both BETA MECH FLIGHT FINE LIMIT and the OSG valve serve somewhat redundant functions, but in response to different stimuli. An overspeed condition activates the OSG, while a fine-pitch condition (which can cause an overspeed condition) actuates the flight fine limit.

The preceding discussion has assumed that the propeller is providing forward thrust. The operation must be modified when the propeller is providing reverse thrust.

FIG. 5: LOGIC REVERSING VALVE (LRV)

Figure 10:
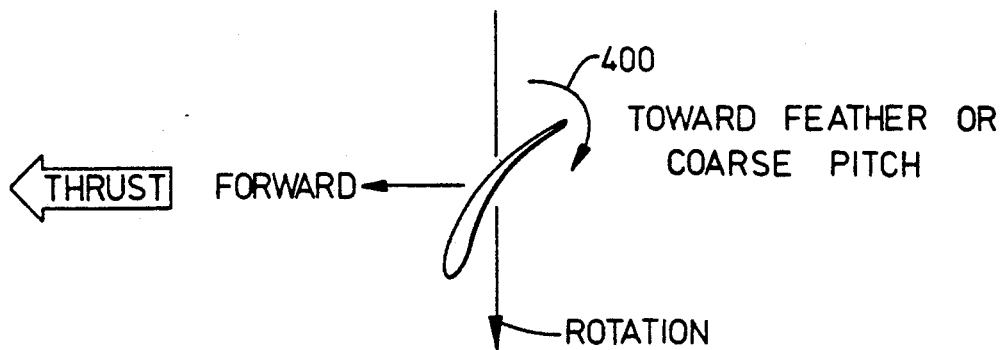
FIG. 10 illustrates a cross-sectional view of a propeller operating in forward thrust.
Figure 11:
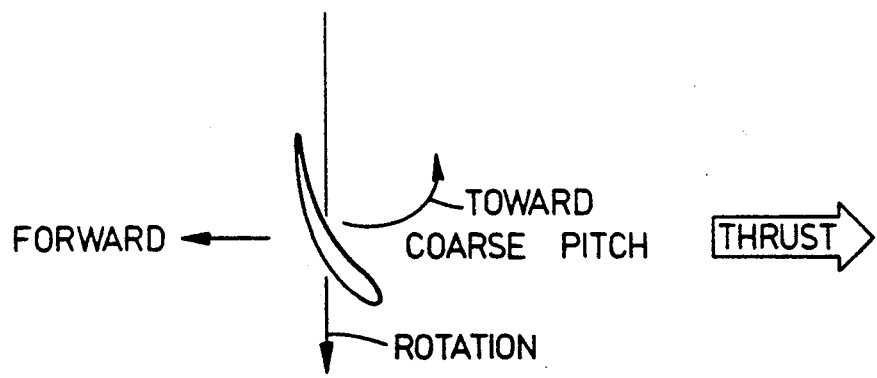
FIG. 11 illustrates a cross-sectional view of a propeller operating in reverse thrust.

Pitch Rotation Toward Coarse Pitch in Forward Thrust is Opposite to that in Reverse Thrust Forward thrust is illustrated in FIG. 10. Arrow 400 illustrates rotation toward feathered (or coarse) pitch, which increases load and slows the propeller. Reverse thrust is illustrated in FIG. 11. If pitch were to be changed in FIG. 11 as indicated by arrow 400 in FIG. 10, pitch will actually become more fine, instead of coarse, and propeller speed will increase, rather than decrease. Fine pitch is approximately midway between the positions shown in FIGS. 10 and 11. Consequently, rotation away from fine pitch will be in one direction in FIG. 10, and in the opposite direction in FIG. 11.

There is hydraulic circuitry in FIG. 5 which causes the proper pitch-coarsening in reverse thrust, when called for by the overspeed governor. BETA MECH (described above) is linked to a piston 403 in FIG. 5 shown in box 405. When the propeller is in forward pitch, the piston is in the position shown, and the following lines are connected: 407 with 409, 411 with 413, and 417 with 419. These connections are summarized in the column labeled "FWD" in FIG. 9.

A key point of the summary is that, in forward pitch, high pressure ("HI," which is about 4,000 psi) is applied to line 409, while low pressure ("LO," about 80 psi) is applied to line 413. (This is the situation which was presumed in the explanation of FIGS. 6 and 8, above. In this situation, when the PCV 312 in FIG. 9 moves leftward, under the influence of either BETA MECH or the OSG, high pressure is applied to the FEATHER line, thus driving propeller pitch toward feather.) This is proper when the propeller is providing forward thrust.

However, when the propeller is providing reverse thrust, BETA MECH senses this, based on pitch angle. BETA MECH then moves the Logic Reversing Valve (LRV) 403 in FIG. 5 and makes the connections which are summarized in the column labeled "REVERSE" in FIG. 9. Now, the pressures on lines 409 and 413 are reversed. Consequently, when the PCV 312 moves leftward, the connections indicated by arrows 420 are made, and high pressure is fed to line 419. The motor 72 rotates in the opposite direction as when high pressure is applied to the FEATHER line. As explained above in connection with FIGS. 10 and 11, this opposite rotation is required when the propeller is in reverse pitch.

FEATHER BRAKE

Figure 4:
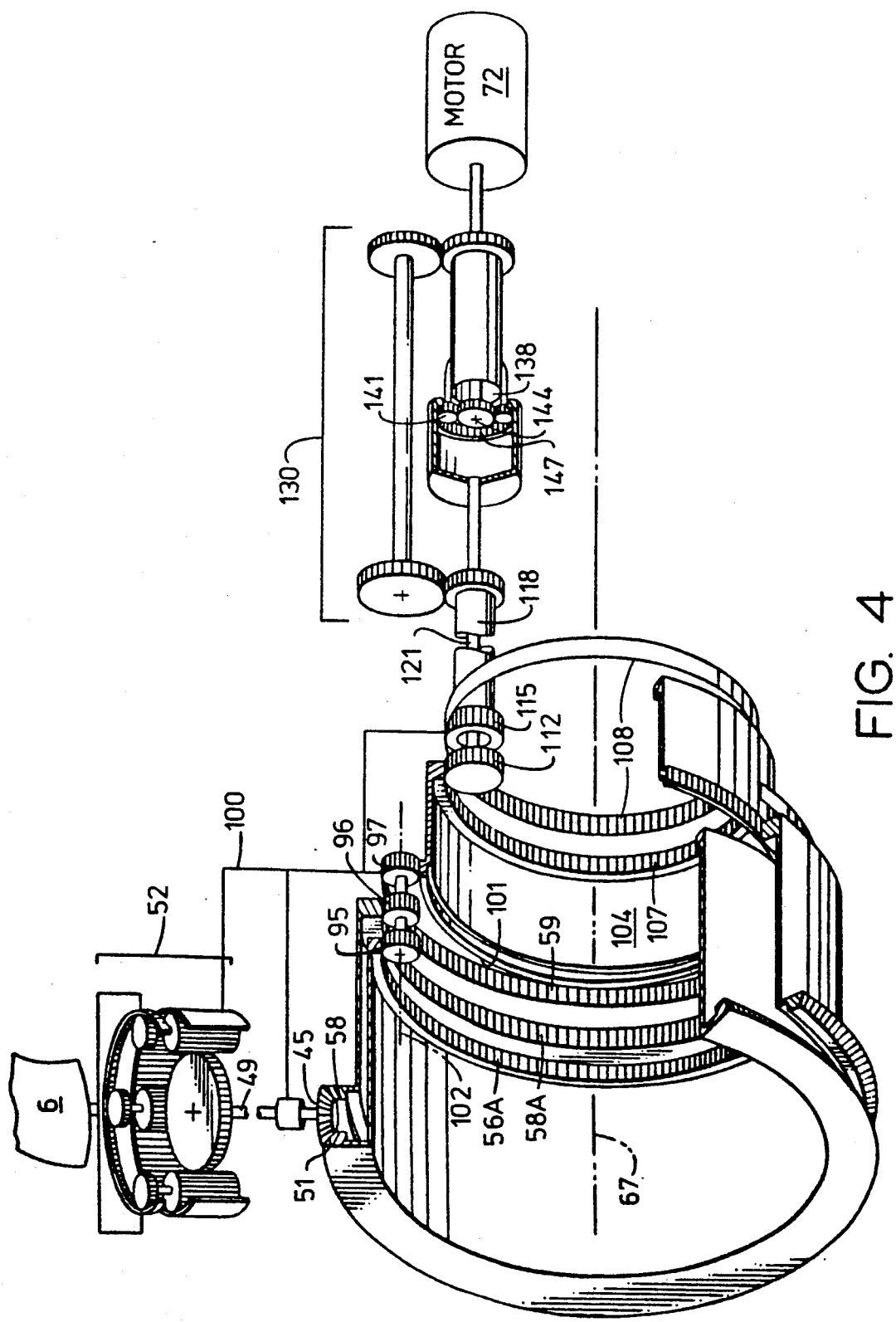
FIG. 4 shows a more complex gear train for changing pitch.

In FIG. 5, a brake 429 stops rotation of shaft 121 in the absence of fluid pressure on line 431, because of spring 432. This shaft is also shown in FIG. 4, and is connected to pinion gear 112. When this shaft is stationary, or retarded, it causes pinion gears 112 and 115 to rotate at different speeds, thus driving the propeller blade toward feathered position, as explained in the Background of the Invention. (The gear ratios are selected such that this feathering occurs when the brake is applied. The ratios could be selected such that the opposite occurs, which would be contrary to the present invention. Also, the feather brake is used only in forward thrust, because, in reverse thrust, application of the feather brake would drive pitch out of reverse and into fine pitch.)

The brake 429 in FIG. 5 is controlled by the pressure in line 431, which is controlled by a feather solenoid 421. This solenoid is electrically activated, and, when activated, applies high pressure to line 431. The high pressure drives piston 432 to the right, thus releasing the brake shoe 433 from brake disc 434. When the solenoid is not activated, no high pressure is applied to line 431, and the brake shoe 433 drags the disc 434 to a stop.

Since the solenoid applies no pressure to the brake when the solenoid is not actuated, it can be called a normally closed type, meaning that flow and pressure are both blocked when no actuating current is applied to its coil.

Figure 1:
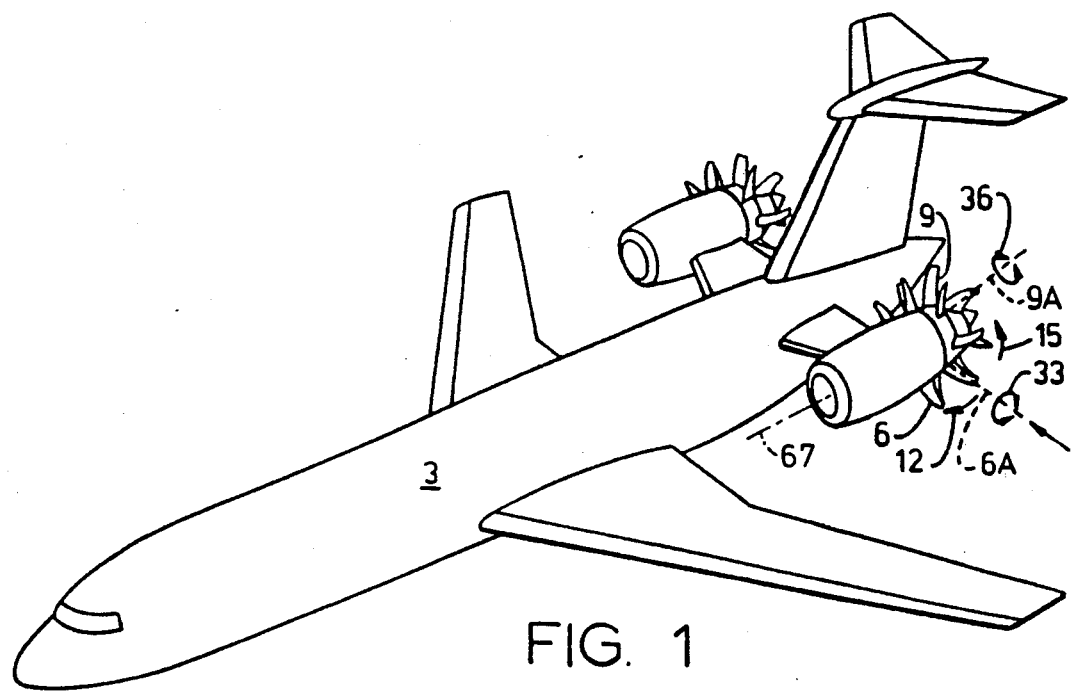
FIG. 1 illustrates an aircraft with which the present invention can be used.
Figure 2:
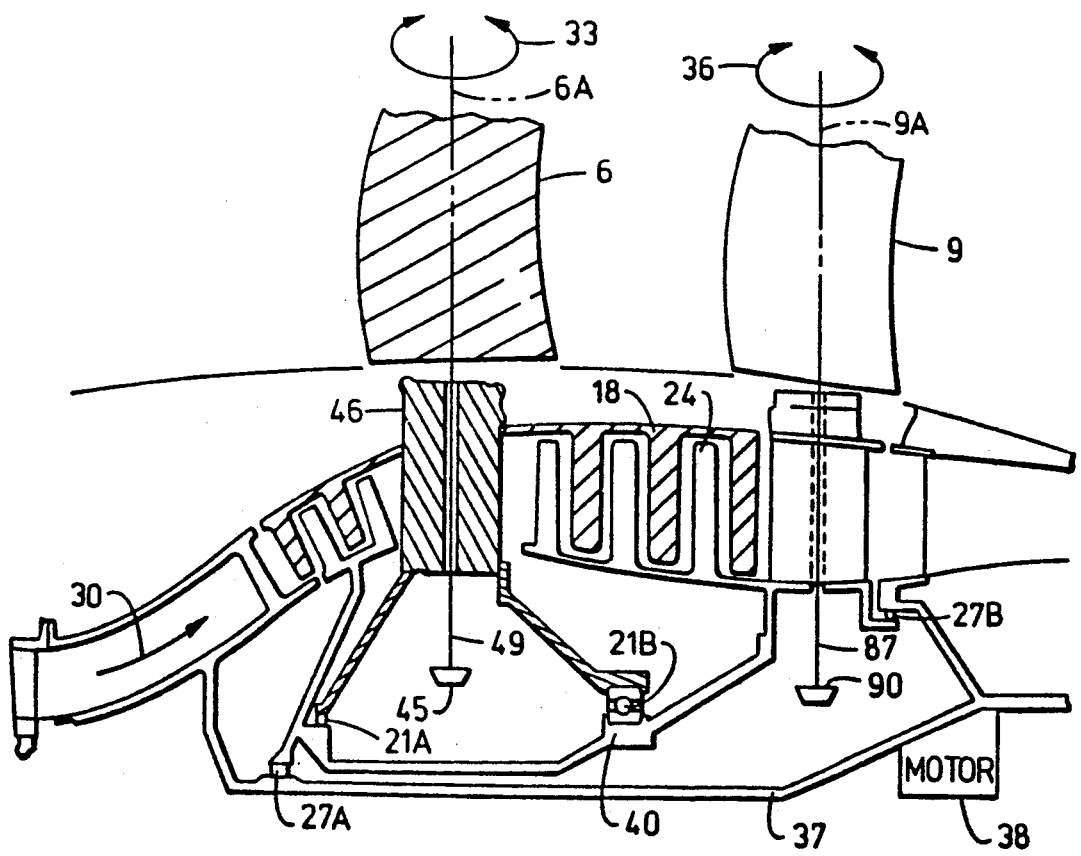
FIG. 2 is a schematic cross-sectional view of a turbine system which drives the propellers shown in FIG. 1.

One advantage of the arrangement just described is that, if a general failure of electric power should occur, the brake 429 stops shaft 121 and drives the propellers into feathered pitch, which applies high load to the turbines in FIG. 2. Overspeeding of the propellers is prevented.

The solenoid can be designed oppositely, if desired. In such a case, the solenoid would be continuously deactivated during engine operation and activated when feather brake action is desired.

DE-ACTUATION OF FLIGHT FINE LIMIT

A flight fine limit (FFL) is actuated by the release of pressure on line 440 in FIG. 5. A spring 445 drives lever 333 to the left, thus positioning the lever to move PCV 312 to the left if pitch is inadvertently driven below the FFL position. Lever 333 is controlled by the BETA MECH, which moves the lower end of lever 333 both left and right in proportion to the blade pitch angle. The upper end of lever 333 moves through a free travel zone, not contacting piston 312, while pitch angle is operating above the FFL. If pitch angle attempts to travel below the FFL position, the BETA MECH moves the lower end of lever 333 to the right. Through action of the pivot at the center of lever 333 the rightward motion is transmitted proportionally in a left direction at the upper end of lever 333, contacting PCV 312 and driving it to the left. Thus, the system proportionally ports high pressure and flow to the feather line of motor 72, thus overriding the control of the EHSV and holding pitch angle at the FFL position.

To deactivate the flight fine limit, pressure is applied to line 440, driving the lever 333 to the right, and disengaging the lever 333 from the PCV 312. Pitch is allowed to become fine at this time, and even to become negative, as reverse pitch is sometimes viewed.

The pressure is applied by a solenoid valve 446, which can be viewed as a normally closed type, as that term is explained above: if no electrical activation is applied to the solenoid, the valve is closed and no pressure is applied to line 440.

An advantage of this arrangement is shown in the following example. The flight fine limit is imposed by the pilot (or by automatic equipment) during the flight, when unintentional flattening of pitch is not desired. If an electrical failure occurs, the spring 445 maintains the flight fine limit, and pitch is kept out of fine status. Similarly, if the flight fine limit is disengaged (i.e., pressure on line 440 keeps the lever 333 on the right), then when an electrical failure occurs, pressure is released on line 440 and the spring again imposes the flight fine limit: lever 333 rotates to the left, enabling the flight fine limit system. In either case, failure of electrical power imposes the flight fine limit: pitch cannot fall below the limit set by lever 333.

OPTION: OSG CAN APPLY FEATHER BRAKE

Line 470 in FIG. 5 connects between the overspeed governor (OSG) and line 475 by way of the cavity 477 in the logic reversing valve (LRV), but only when the LRV is in the forward thrust position, which is that shown. If an overspeed condition occurs, such that the flyweights pull the OSG valve 303 sufficiently far to the right, lines 470 and 471 in FIG. 5 become connected.

Line 471 connects with a sump, thus draining lines 417 and 431, applying brake 429 and thus driving the propeller toward feather. Thus, the overspeed governor has two modes of operation. First, if an overspeed occurs, it drives the PCV 312 to the left, which drives motor 72 toward feather. Second, if the overspeed condition worsens, the OSG piston moves farther to the right in FIG. 8 and applies the feather brake.

EXAMPLE OF OPERATION

Upon start-up of the engine, the propellers should normally be in feathered pitch, because the system leaves them in feathered pitch at shut-down, as will be explained at the end of this example. If they are not in feather, during start-up, the feather brake will drive them toward feather because it retards shaft 121 in FIG. 4 until sufficient hydraulic pressure is applied to line 431 in FIG. 5. (The hydraulic pressure is provided by a pump, 450 in dashed box 200, which is driven by a gear linkage running to the gas generator. Thus, the hydraulic pressure is dependent on engine speed.)

When hydraulic pressure becomes fully developed, which occurs near idle speed, the feather brake releases shaft 121, the PCV's assume the position shown in FIG. 6 because the pressure in cavities 307 and 310 balance each other, and the EHSV in FIG. 6 assumes pitch control, in response to signals received from an electronic engine control unit, ECU. The engines are still at idle, and the propellers are probably rotating at this time.

At about this time, the ECU drives the blades to a near-fine pitch, and checks that selected components in FIG. 5, as well as others, are functioning properly.

When take-off thrust is applied, solenoid 446 in FIG. 5 releases pressure on line 440, thus allowing spring 445 to drive lever 333 to the position shown, thus imposing the flight fine limit (FFL). This limit is desirable because it prevents unwanted electrical or hydraulic signals from causing either a too-fine pitch condition or thrust reversal in flight.

After take off, and during cruise conditions, the configuration of the gear train shown in FIG. 4 allows the hydraulic motor 72 in FIG. 4 to remain stationary, except when pitch change is executed. (It is recognized that the motor may not remain perfectly stationary, but that a slight oscillation may occur, as continuous pitch adjustments are made, in order to maintain propeller speed.)

If an in-flight shutdown of the engine should occur, then pressure to the feather brake is lost and the brake retards shaft 121 in FIG. 4, thus driving the blades toward feather. Restated, the windmilling of the propellers causes the gear train in FIG. 4 to crank the blades into feathered position when shaft 121 is retarded or locked. Further, the pilot can directly actuate the feather brake by activating the feather solenoid 421.

Upon touchdown, the ECU disables the FFL by applying pressure to line 440 in FIG. 5. This is necessary because, in order to reach reverse pitch, as shown in FIG. 11, the blade pitch must traverse through fine pitch en route. The flight fine limit would prevent this traversal.

After touch-down, the pilot selects reverse thrust. Before reverse thrust is allowed by the ECU, however, the ECU verifies that ground conditions are proper. The ECU checks such parameters as airspeed, gas generator speed, landing gear position, weight on landing gear, as well as other parameters. If the ECU determines that reverse thrust can in fact be applied, then the following sequence of events occurs, under control of the ECU:

1. In flight, and initially after touchdown, the arms 256 of the hydraulic motors 72 in FIG. 5 are positioned so that the motors 72 can deliver maximum torque (at reduced speed).

2. Both motors are now commanded to drive into reverse at full speed.

3. At approximately 20 degrees pitch, the BETA MECH in FIG. 5 will shift the wobble plates to a smaller angle A in FIG. 7E, so that the slew rate of the blades now increases, preferably to double the former slew rate (at half the torque). One reason is to drive the blades as fast as possible through regions of fine and near-fine pitch, because at these pitches, the loading on the propeller blades in FIG. 2 is lowest, and the possibility of overspeeding due to windmilling at high airspeed on the ground increases.

4. At zero degrees pitch, BETA MECH shifts the LRV to the reverse position, so that the pressures on the lines leading to the PCV are those shown in the column labeled "REVERSE" in FIG. 9. With this LRV reversal, upon overspeed, the OSG will drive pitch in a direction which increases load on the propeller blades and reduces propeller speed.

5. At about negative 15 degrees, BETA MECH will shift the arms 256 in FIG. 5 back to the high-torque, low speed position, in order to increase torque: angle A in FIG. 7E increases.

The ECU now controls propeller speed in reverse thrust by controlling the hydraulic motors 72. (Logic in the ECU now reverses the pressures applied to lines 206 and 207 in FIG. 6 during reverse thrust. That is, for the same reasons described above in connection with the LRV, the direction of pitch change to accomplish a reduction in propeller speed must be opposite in reverse as compared to forward thrust.)

6. After the aircraft has docked, the pilot shuts down the engine. This, in itself, as indicated above, will drive the blades to feather, at least for the reason of loss of hydraulic power. In addition, the pilot can de-activate the feather solenoid 421 in FIG. 5, which applies the feather brake. Thus, on shutdown, the blades crank themselves into feather as they decelerate. The feathering assists deceleration somewhat by increasing drag torque of the propellers.

Four significant features of the invention are the following.

First, in one form of the invention, the propeller blades lack feather-inducing counterweights. In a propeller generally, the action of centrifugal force causes the blades to move toward flat pitch. To counter this flat-pitch tendency, counterweights are installed which tend to rotate the propeller the opposite direction. With the invention, counterweights are not used.

Figure 3:
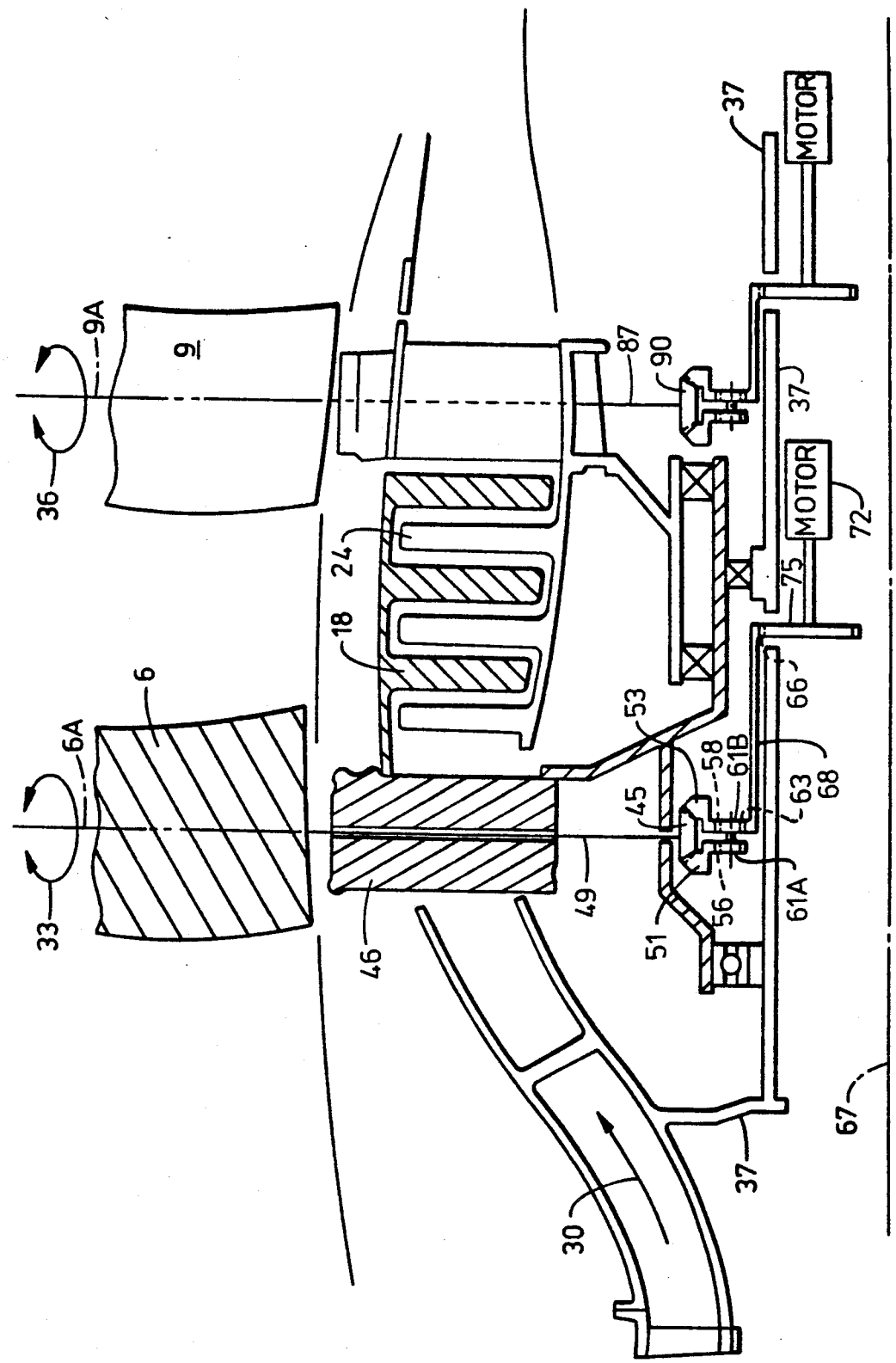
FIG. 3 shows a simplified gear train for changing pitch of the propeller blades of FIGS. 1 and 2.

Second, pinion gear 75 in FIG. 3 can be viewed as an input gear. It is constantly rotating. An acceleration changes pitch in one direction, and a deceleration changes pitch in the opposite direction. In this respect, pinion gear 112 in FIG. 4 behaves as a similar input gear. Further, with both of these pinion gears, it is a speed change which causes pitch to change, and the direction of the speed change (i.e., up or down) determines the direction of pitch change.

Sun gear 144 in FIG. 4 can be viewed as a stationary input gear, and the direction of rotation of the sun gear determines the direction of pitch change. That is, although the sun gear is stationary in the absence of pitch change, unlike pinion 112 in FIG. 4, it moves in two different directions, namely, forward and reverse. Each movement causes pitch to change in a different direction.

Third, upon failure of the control system, the OSG and BETA MECH FFL can be viewed as causing a particular type of motion of the motor 72, namely, FORWARD COARSE (which drives pitch toward feather in flight). Conversely, when the propeller is in reverse thrust, REVERSE COARSE is the motion which coarsens pitch, but while the propeller is in reverse thrust.

Fourth, when the propeller is in reverse pitch, the LRV reverses the hydraulic polarity of the output of the PCV, so that now the OSG can cause REVERSE COARSE motion of the motor to occur when an overspeed occurs.

Numerous substitutions and modifications can be undertaken without departing from the true spirit and scope of the invention. What is desired to be secured by Letters Patent is the invention as defined in the following claims.

We claim:

1. An aircraft propeller system, comprising:
   a) a sensor for sensing propeller speed and providing a speed signal in response;
   b) a reversible motor, which is driven by a power source and linked to propeller blades, which can selectively increase or decrease pitch;
   c) means for receiving the speed signal and for ordering the motor to provide pitch coarsening when the speed signal exceeds a limit;
   d) means for reversing polarity of the motor when the propeller provides reverse thrust; and
   e) flight fine limit means for setting a minimum limit to propeller blade pitch in flight, such that propeller blade pitch cannot fall below the limit, irrespective of pitch demand signals provided by an external source.

2. An aircraft propeller system comprising:
   a) a plurality of propeller blades;
   b) a sensor for sensing propeller speed and providing a speed signal in response;
   c) motive means for receiving the speed signal and driving pitch of the propeller blades toward coarse pitch, in both forward and reverse pitch states, when the speed signal exceeds a limit; and
   d) flight fine limit means for setting a minimum limit to propeller blade pitch in flight, such that propeller blade pitch cannot fall below the limit, irrespective of pitch demand signals provided by an external source.

3. An aircraft propeller system as recited in claim 1, wherein
   the propeller blades have no associated feather-inducing counterweights.

4. In an aircraft propeller having a pitch-change mechanism of the hydraulic type, an overspeed protection system comprising:
   a) a plurality of propeller blades;
   b) governor means for sensing propeller speed and providing a hydraulic pitch-coarsening signal when an overspeed condition exists due to propeller speed exceeding a limit, said overspeed condition comprising a magnitude defined as said limit minus propeller speed;
   c) means for receiving the pitch-coarsening signal and, in response, driving pitch of the propeller blades toward coarse pitch, whether the propeller blades are in forward or reverse pitch; and
   d) a feather brake for driving the pitch of the propeller blades toward coarse pitch, wherein said feather brake
      i) is applied only when the propeller is operating in forward thrust mode,
      ii) does not require hydraulic pressure to be applied, and
      iii) is applied by said governor means when said overspeed condition magnitude increases in value after said hydraulic pitch-coarsening signal has been provided.

5. An aircraft propulsion system, comprising:
   a) an aircraft propeller including a plurality of propeller blades characterized by the absence of feather-inducing counterweights;
   b) a gear train linked to the propeller blades for changing propeller blade pitch when an input gear changes speed;
   c) a motor for inducing the speed change in the input gear; and
   d) a control system comprising:
      i) means for controlling the motor speed in response to speed control signals provided by an associated control;
      ii) means for allowing a pilot to constrain pitch above a predetermined limit; and
      iii) means for allowing the pilot to selectively induce feathering of pitch, irrespective of motor speed.

6. An aircraft propulsion system as recited in claim 5, further comprising:
   e) means for sensing propeller speed and driving propeller blade pitch toward coarse pitch when propeller speed exceeds a limit, both in forward and reverse thrust operation.

7. An aircraft propeller system, comprising:
   a) a hydraulic motor linked to the propeller such that a first type of motor actuation drives the propeller toward feathered pitch and a second type of actuation drives the propeller toward fine pitch;
   b) hydraulic control means for
      i) receiving pitch demand signals from an external source and actuating the hydraulic motor in accordance with said signals during normal operation;
      ii) sensing whether propeller speed exceeds a limit, and driving the propeller toward feather in response, irrespective of the pitch demanded by the pitch demand signals;
      iii) setting a minimum limit to pitch in flight, such that pitch cannot fall below the limit, irrespective of the pitch demand signals; and
      iv) sensing whether the propeller is operating in reverse thrust mode, and, in response, if propeller speed exceeds a limit, driving the propeller toward REVERSE COARSE in response.

8. In an aircraft propulsion system comprising a propeller having an associated control which provides pitch demand signals, a hydraulic system for changing pitch comprising:
   a) a hydraulic motor linked to the propeller through a gear train which changes pitch in a direction determined by the direction of motor movement, and which maintains pitch fixed in the absence of motor movement;
   b) a feather brake linked to the gear train for driving pitch toward feather, irrespective of direction of motor movement;
   c) a servovalve which receives the pitch demand signals and provides a controlled hydraulic pressure in response;
   d) a pitch coarsening valve which can selectively connect the motor either to the controlled hydraulic pressure of paragraph (c) or to a pair of pressurized inputs;
   e) an overspeed governor connected to the propeller, which causes the pitch coarsening valve to connect the pressurized inputs to the hydraulic motor when propeller speed exceeds a limit;
   f) BETA sensing means for ascertaining whether the propeller is in forward or reverse pitch;
   g) logic reversing means coupled to the BETA sensing means for reversing the hydraulic polarity of the pressurized inputs of paragraph (d) when the propeller pitch enters reverse pitch; and
   h) means for increasing maximum motor speed when pitch is within a predetermined range of flat pitch.

9. In an aircraft propulsion system comprising first and second counterrotating propellers having respective first and second pitches defined therein and having an associated control which provides first and second pitch demand signals for the respective propellers, a hydraulic system for changing pitch comprising:
   a) a first hydraulic motor linked to the first propeller through a first gear train which changes first pitch in a direction determined by the direction of first motor movement, and which maintains first pitch fixed in the absence of first motor movement;
   b) a first feather brake linked to the first gear train for driving first pitch toward feather, irrespective of direction of first motor movement;
   c) a first servovalve which receives the first pitch demand signals and provides a first controlled hydraulic pressure in response;
   d) a first pitch coarsening valve which can selectively connect the first motor either to the first controlled hydraulic pressure of paragraph (c) or to a first pair of pressurized inputs;
   e) a first overspeed governor which causes the first pitch coarsening valve to connect the first pair of pressurized inputs of paragraph (d) to the first hydraulic motor when first propeller speed exceeds a limit;
   f) first BETA sensing means for ascertaining whether the first propeller is in forward or reverse pitch;
   g) first logic reversing means coupled to the first BETA sensing means for reversing the hydraulic polarity of the first pressurized inputs of paragraph (d) when the first pitch enters reverse pitch;
   h) means for increasing first motor maximum speed when first pitch is within a predetermined range of flat pitch;
   i) a second hydraulic motor linked to the second propeller through a gear train which changes second pitch in a direction determined by the direction of second motor movement, and which maintains second pitch fixed in the absence of second motor movement;
   j) a second feather brake linked to the gear train for driving second pitch toward feather, irrespective of direction of motor movement;
   k) a servovalve which receives the second pitch demand signals and provides a second controlled hydraulic pressure in response;
   l) a second pitch coarsening valve which can selectively connect the second motor either to the second controlled hydraulic pressure of paragraph (k) or to a second pair of pressurized inputs;
   m) a second overspeed governor which causes the second pitch coarsening valve to connect the second pair of pressurized inputs to the second hydraulic motor when second propeller speed exceeds a limit;
   n) second BETA sensing means for ascertaining whether the second propeller is in forward or reverse pitch;
   o) second logic reversing means coupled to the second BETA sensing means for reversing the hydraulic polarity of the second pair of pressurized inputs of paragraph (l) when second pitch enters reverse pitch; and
   p) means for increasing second motor maximum speed when second pitch is within a predetermined range of flat pitch.

* * * * *